Nov. 29, 1949     A. L. SMITH     2,489,827
COMBINED COTTON GIN AND LINT CLEANER
Filed Feb. 16, 1948
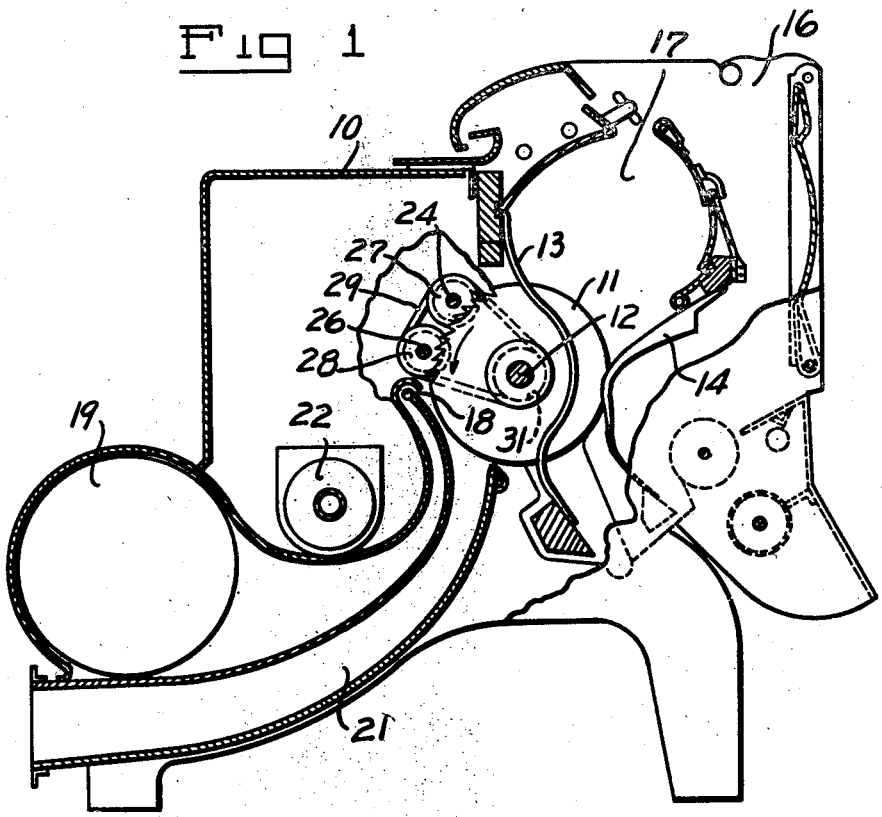
INVENTOR.
Algernon L. Smith
BY
*Henry L. Jennings*
Attorney Patented Nov. 29, 1949

2,489,827

UNITED STATES PATENT OFFICE 2,489,827

COMBINED COTTON GIN AND LINT CLEANER

Algernon L. Smith, Birmingham, Ala., assignor to Continental Gin Company, a corporation of Delaware Application February 16, 1948, Serial No. 8,688

1 Claim. (Cl. 19—55)

This invention relates to cotton gins and has for an object the provision of means in the gin to clean lint cotton after it is stripped from the seeds and before it is doffed from the saw cylinder.

A further object of my invention is to provide, in a cotton gin, one or more rotary cleaning bars extending alongside the saw cylinder which bars are interposed between the gin ribs and the doffing means in position to be struck by the lint being carried around by the gin saws.

A still further object of my invention is to provide, in a cotton gin having an air doffing nozzle, one or more rotary cleaning bars extending alongside the saw cylinder between the gin ribs and the air doffing nozzle in position to be struck by lint cotton being carried around by the gin saws, one of said cleaning bars being mounted closely adjacent the air doffing nozzle to remove lint accumulating thereon.

As is well known in the art to which my invention relates, it has heretofore been the practice, when ginning seed cotton, to depend on cleaning operations carried out entirely before the lint was removed from the seeds, to remove foreign matter from the cotton. A variety of cleaning, drying and hulling apparatus has been employed for such purposes. It is also well known that such apparatus has not been entirely effective and that much dirt and fine trash is carried with the lint removed from the seeds, which dirt lowers the grade of the cotton and the price obtainable therefor. This difficulty has greatly increased since the advent of mechanical cotton pickers.

Furthermore, the dirt and fine trash carried with the lint is incorporated in the bale of cotton where it becomes more strongly attached to the lint due to the pressure and packing in the bale. All this dirt and trash must be removed at the cotton mill before the cotton can be carded and spun, which necessitates considerably more machinery and cleaning operations.

It has accordingly been long recognized that some means were needed to clean the dirt and trash from lint cotton after its separation from the seed and before it is baled. In accordance with my invention herein described the means for accomplishing this desirable result is incorporated in the gin itself by mounting one or more rotary cleaning bars adjacent the saw cylinder, between the gin ribs and the doffing means, in position to be struck by the lint being carried around by the gin saws.

Apparatus embodying features of my invention is illustrated in the accompanying drawing, forming a part of this application, in which:

Fig. 1 is a vertical transverse section through a cotton gin having my invention incorporated therein;

Fig. 2 is a detail elevational view of a preferred form of cleaning bar; and,

Fig. 3 is a sectional view thereof.

Referring now to the drawing for a better understanding of my invention, I show a cross section of a well known form of gin embodying a casing 10 having mounted therein a multiplicity of saws 11 on a rotary shaft 12, the assembly forming a saw cylinder. Coacting with the saws 11 are a multiplicity of gin ribs 13 and a multiplicity of huller ribs 14. As is well understood in the art to which my invention relates, seed cotton containing dirt, trash, and hulls, is fed into the breast of the gin at 16, and the saws 11 pull the cotton, with the seeds in it, between the ribs 14, stripping it from the hulls. In the roll box 17, the lint is stripped from the seeds by the saws in cooperation with the gin ribs and is carried around by the saws to a doffing nozzle 18. Air is supplied to the doffing nozzle 18 from a conduit 19 and is directed by the nozzle downwardly, as shown, to blow the lint off the gin saws from whence it passes through a lint passage 21, to other apparatus, not shown. The cotton seeds, separated in the roll box 17, fall downwardly in front of the ribs 13 and are removed by any suitable means, not shown. Disposed behind the doffing nozzle 18 is a mote conveyor 22 which heretofore has been employed solely to carry off any dirt or trash thrown off from the gin saws by centrifugal force. All of the parts heretofore described are old and well known in the art and need no further detailed description. It will also be understood that my invention is not limited to the particular design of cotton gin shown but that it is applicable to any type embodying a saw cylinder, gin ribs and doffing means, and in particular that it is not limited to a gin embodying air doffing means.

My invention consists in mounting between the gin ribs 13 and the doffing means one or more rotary cleaning bars in close proximity to the saw cylinder.

In the drawing, I show two cleaning bars 24 and 26 which extend parallel to the long axis of the saw cylinder 11 and are mounted in close proximity to the saw cylinder so that the lint cotton being carried around by the gin saws strikes the bars, thus subjecting it to a beating action. This beating action strips the trash and dirt clinging to the cotton fibers, and throws it out where it falls in the path of the mote conveyor 22. In practice, I have found that the bars may be mounted from $\frac{1}{32}$ to $\frac{1}{16}$ of an inch away from the surface of the saw cylinder. The bars are rotated by any suitable means such as by pulleys 27 and 28, a belt 29, and another pulley 31 carried on the end of the saw cylinder shaft 12. The direction of rotation of both bars is preferably the same as that of the saw cylinder 11, whereby their surfaces adjacent to the saw cylinder are moving in a direction opposite to the adjacent surface of the saw cylinder. This increases the cleaning action of the bars.

While the cleaning bars 24 and 26 may be made smooth as shown in Fig. 1, I preferably form them with flutes or serrations 32 extending lengthwise thereof, as shown in Figs. 2 and 3 of the drawing.

While any suitable number of cleaning bars may be employed, I have found that only one bar removed the greater proportion of the dirt from the lint. Whatever number is employed, they are preferably so spaced that the cotton fibers may flare outwardly after striking one of the bars and before striking the succeeding bar.

From the foregoing, it will be apparent that I have devised a cotton gin which incorporates means for cleaning the lint of dirt and trash clinging thereto after the lint is separated from the seeds, which means is simple of operation, may be applied to any existing gin, and which is effective in operation.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claim.

What I claim is:

In a cotton gin embodying a breast with gin ribs mounted therein, a rotary saw cylinder cooperating with the ribs to remove lint from the cotton seeds, and a doffing means for removing lint cotton from the saw cylinder; the improvement which comprises a plurality of cleaning bars interposed between the gin ribs and the doffing means and extending parallel to the long axis of the saw cylinder in position to be struck by lint being carried around by the saw cylinder, said bars being spaced apart a sufficient distance for lint to flare outwardly after striking one bar and before reaching the next bar, and means to rotate the cleaning bars in the same direction of rotation as the saw cylinder.

ALGERNON L. SMITH.

REFERENCES CITED

The following references are of record in the file of this patent:

UNITED STATES PATENTS

| Number | Name | Date |
|---|---|---|
| 8,803 | Laws | Mar. 16, 1852 |
| 19,415 | Garlington | Feb. 23, 1858 |
| 246,276 | Kinney | Aug. 23, 1881 |
| 408,566 | Young | Aug. 6, 1889 |
| 2,187,867 | Streun | Jan. 23, 1940 |